(12) United States Patent
Seo et al.

(10) Patent No.: US 11,605,857 B2
(45) Date of Patent: Mar. 14, 2023

(54) BATTERY PACK

(71) Applicant: LG CHEM, LTD., Seoul (KR)

(72) Inventors: Sung-Won Seo, Daejeon (KR);
Jeong-O Mun, Daejeon (KR);
Yoon-Koo Lee, Daejeon (KR);
Ho-June Chi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 247 days.

(21) Appl. No.: 16/310,539

(22) PCT Filed: Jan. 4, 2018

(86) PCT No.: PCT/KR2018/000199
§ 371 (c)(1),
(2) Date: Dec. 17, 2018

(87) PCT Pub. No.: WO2018/174388
PCT Pub. Date: Sep. 27, 2018

(65) Prior Publication Data
US 2019/0334137 A1    Oct. 31, 2019

(30) Foreign Application Priority Data
Mar. 22, 2017 (KR) .......................... 10-2017-0036034

(51) Int. Cl.
*H01M 50/20* (2021.01)
*H01M 10/48* (2006.01)

(52) U.S. Cl.
CPC ......... *H01M 50/20* (2021.01); *H01M 10/482* (2013.01); *H01M 2220/20* (2013.01)

(58) Field of Classification Search
CPC .......................... H01M 50/20; H01M 50/258
See application file for complete search history.

(56) References Cited

U.S. PATENT DOCUMENTS

| | | | |
|---|---|---|---|
| 5,496,657 A | 3/1996 | Dixon, Jr. | |
| 5,981,101 A | 11/1999 | Stone | |
| 6,622,809 B2 * | 9/2003 | Takahashi | B60K 6/405 903/952 |
| 9,196,880 B2 | 11/2015 | Kim | |
| 9,882,178 B2 | 1/2018 | Kim et al. | |

(Continued)

FOREIGN PATENT DOCUMENTS

| CN | 104603978 A | 5/2015 |
|---|---|---|
| DE | 10 2013 010 001 A1 | 12/2014 |

(Continued)

OTHER PUBLICATIONS

Machine translation of Japanese Patent Publication 2016-152133, published Aug. 22, 2016. (Year: 2016).*

(Continued)

*Primary Examiner* — Stewart A Fraser
*Assistant Examiner* — Lilia Nedialkova
(74) *Attorney, Agent, or Firm* — Birch, Stewart, Kolasch & Birch, LLP

(57) ABSTRACT

A battery pack includes a plurality of battery modules, each battery module having a plurality of stacked battery cells and a casing member surrounding the plurality of battery cells, and a connection member connecting the plurality of battery modules to each other.

9 Claims, 12 Drawing Sheets

(56) References Cited

U.S. PATENT DOCUMENTS

| | | | |
|---|---|---|---|
| 2011/0117401 A1* | 5/2011 | Lee | H01M 2/0245 429/82 |
| 2011/0165451 A1 | 7/2011 | Kim et al. | |
| 2013/0011719 A1 | 1/2013 | Yasui et al. | |
| 2013/0045403 A1 | 2/2013 | Shin et al. | |
| 2013/0136969 A1 | 5/2013 | Yasui et al. | |
| 2014/0045026 A1* | 2/2014 | Fritz | B60L 50/64 429/99 |
| 2014/0302371 A1 | 10/2014 | Miyawaki et al. | |
| 2015/0044580 A1* | 2/2015 | Yabe | H01M 4/12 429/404 |
| 2015/0255837 A1* | 9/2015 | Larsson | H01M 10/0468 429/120 |
| 2015/0270514 A1* | 9/2015 | Baek | H01M 50/264 429/151 |
| 2015/0311484 A1 | 10/2015 | Katayama et al. | |
| 2016/0056426 A1* | 2/2016 | Subramanian | H01M 50/20 429/151 |
| 2016/0268562 A1* | 9/2016 | Paramasivam | B60K 1/00 |
| 2017/0012330 A1 | 1/2017 | Kim et al. | |
| 2017/0062781 A1 | 3/2017 | Kim | |
| 2017/0244073 A1 | 8/2017 | Yusa et al. | |

FOREIGN PATENT DOCUMENTS

| | | |
|---|---|---|
| JP | 2000-516390 A | 12/2000 |
| JP | 2007-48637 A | 2/2007 |
| JP | 2010232102 A * | 10/2010 ............ H01M 10/04 |
| JP | 2013-186995 A | 9/2013 |
| JP | 2014-35918 A | 2/2014 |
| JP | 2016-110790 A | 6/2016 |
| JP | 2016-152133 A | 8/2016 |
| JP | 2016152134 A * | 8/2016 |
| KR | 10-2011-0081023 A | 7/2011 |
| KR | 10-2011-0132667 A | 12/2011 |
| KR | 10-2012-0058043 A | 6/2012 |
| KR | 10-2012-0086656 A | 8/2012 |
| KR | 10-2012-0114308 A | 10/2012 |
| KR | 10-2012-0130224 A | 11/2012 |
| KR | 10-2014-0128844 A | 11/2014 |
| KR | 10-2015-0040135 A | 4/2015 |
| KR | 10-2015--0099965 A | 9/2015 |

OTHER PUBLICATIONS

Machine translation of Japanese Patent Publication 2016-152134, published Aug. 22, 2016. (Year: 2016).*

Machine translation of Japanese Patent Publication No. 2010/232102, published Oct. 14, 2010. (Year: 2010).*

International Search Report (PCT/ISA/210) issued in PCT/KR2018/000199, dated Jun. 26, 2018.

Office Action issued in Indian Application No. 201817048925 dated Mar. 1, 2021.

Machine Translation of JP 2007-048637 A. Published Feb. 22, 2007.

* cited by examiner

BATTERY PACK

TECHNICAL FIELD

The present application claims priority to Korean Patent Application No. 10-2017-0036034 filed on Mar. 22, 2017 in the Republic of Korea, the disclosures of which are incorporated herein by reference.

The present disclosure relates to a battery pack, and more particularly, to a battery pack capable of improving an energy density.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery may be prepared by applying the positive or negative electrode active material to a current collector made of aluminum or copper sheet, mesh, film, foil, or the like and then drying the same.

Recently, as the demand of hybrid electric vehicle or electric vehicle is increasing, energy storage devices such as battery packs are used more and more in the vehicles. Accordingly, there is a need to develop a battery pack having a high energy density and disposed on an underfloor of a hybrid electric vehicle or an electric vehicle.

DISCLOSURE

Technical Problem

The present disclosure is directed to providing a battery pack having a relatively high energy density by improving the space efficiency.

In addition, the present disclosure is directed to providing a battery pack that may be easily disposed on an underfloor of a hybrid electric vehicle or an electric vehicle.

Technical Solution

In one aspect of the present disclosure, there is provided a battery pack, comprising: a battery module having a plurality of stacked battery cells and a casing member surrounding the plurality of battery cells; and a connection member configured to connect the plurality of battery modules to each other.

Also, the plurality of battery modules connected by the connection member may be arranged in a single layer.

In addition, the plurality of battery modules may be arranged to have at least one column or at least one row.

Also, the casing member may include: an upper casing disposed at an upper portion of the battery cells; and side casings disposed at side surfaces of the battery cells and coupled to the upper casing, and an opening having a preset size may be formed in at least one of the side casings, and the connection member may be coupled to the opening of the side casing.

In addition, the connection member may include: a first insert inserted into the opening of the side casing of any one battery module among the plurality of battery modules; and a second insert inserted into the opening of the side casing of another battery module among the plurality of battery modules.

Also, the connection member may further include a stopper formed between the first insert and the second insert to prevent the first insert and the second insert from being inserted in excess of a predetermined range.

In addition, the stopper may extend from a portion between the first insert and the second insert toward a direction intersecting the direction in which the first insert and the second insert are formed.

Also, the connection member may be fixed to the side casing by means of a screwing structure or a hooking structure.

Meanwhile, in another aspect of the present disclosure, there is also provided a vehicle, comprising the battery pack described above.

Advantageous Effects

According to the embodiments of the present disclosure, the battery pack may have a relatively high energy density by improving the space efficiency.

In addition, since a plurality of battery modules are arranged in a single layer, the battery pack may be easily disposed on an underfloor of a hybrid electric vehicle or an electric vehicle.

BEST MODE

Figure 1:
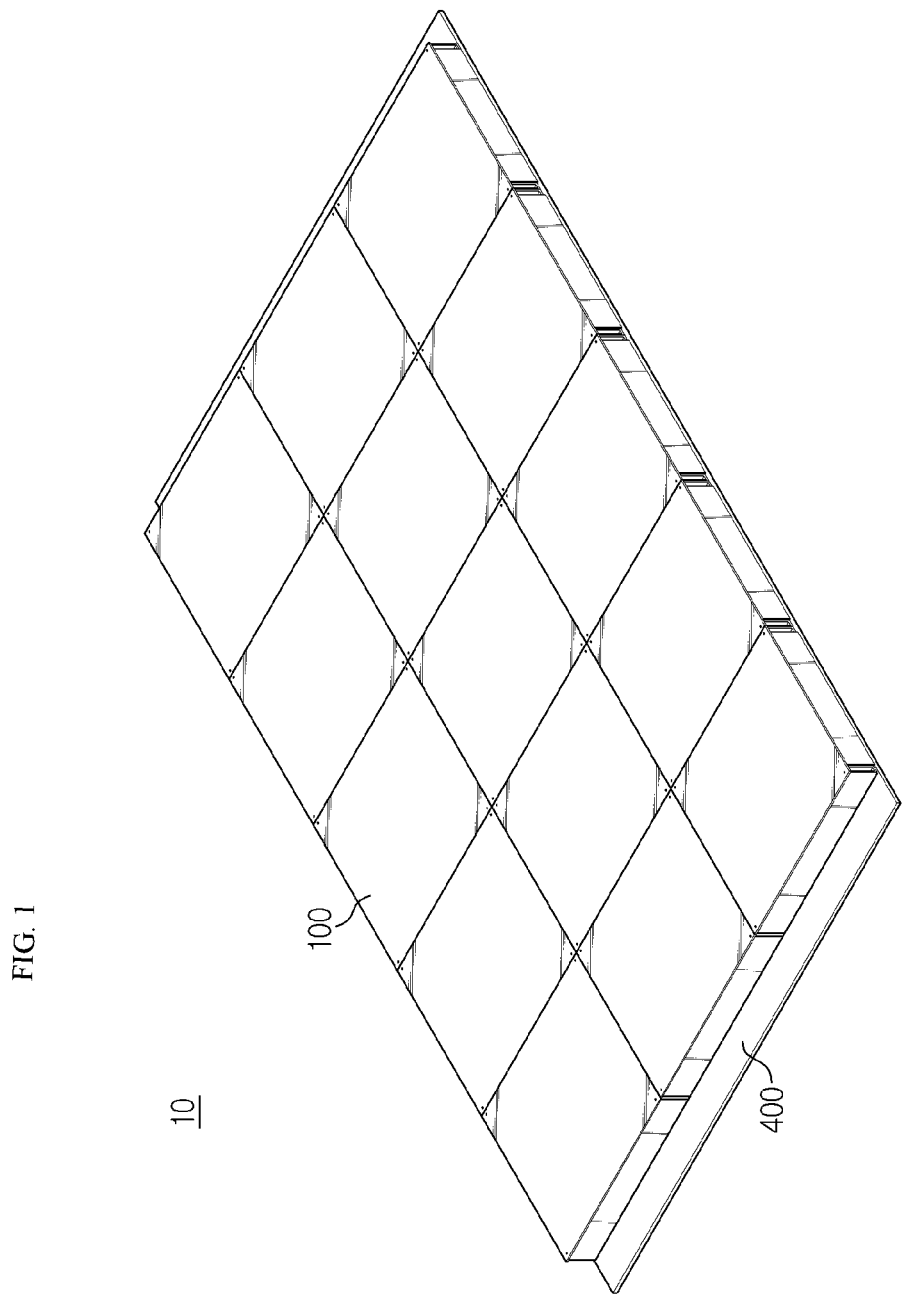
FIG. 1 is a schematic perspective view showing a battery pack according to the first embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
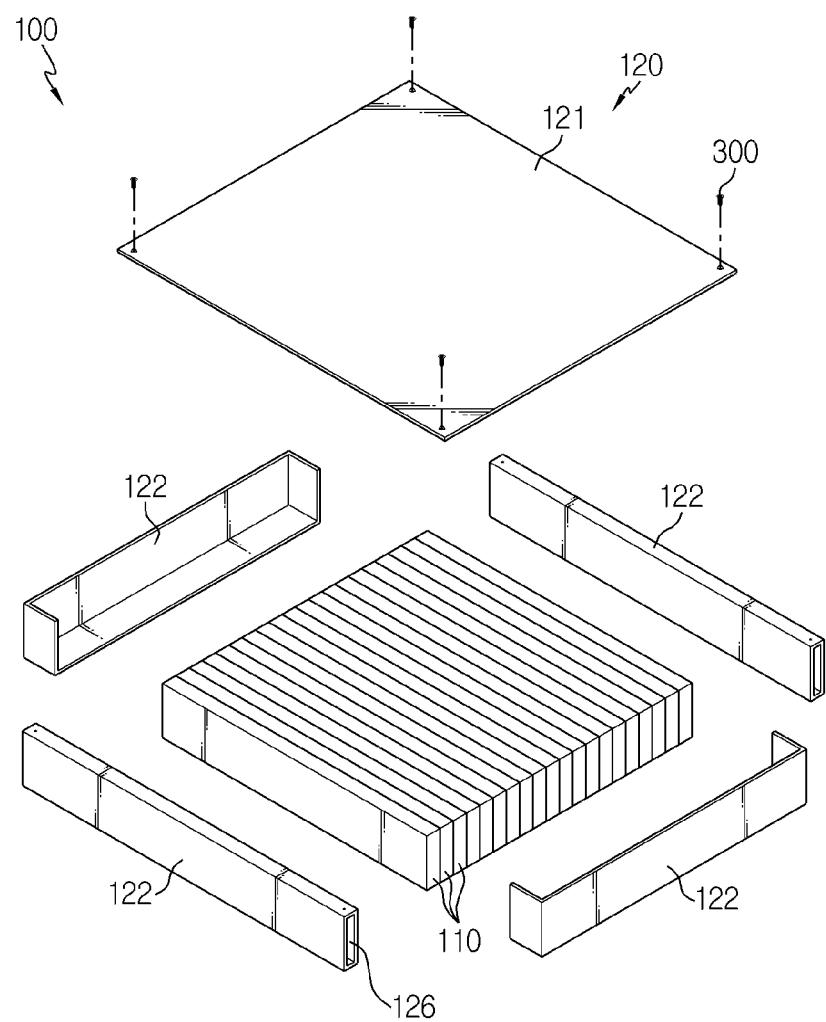
FIG. 2 is an exploded perspective view showing a battery module in the battery pack according to the first embodiment of the present disclosure.
Figure 3:
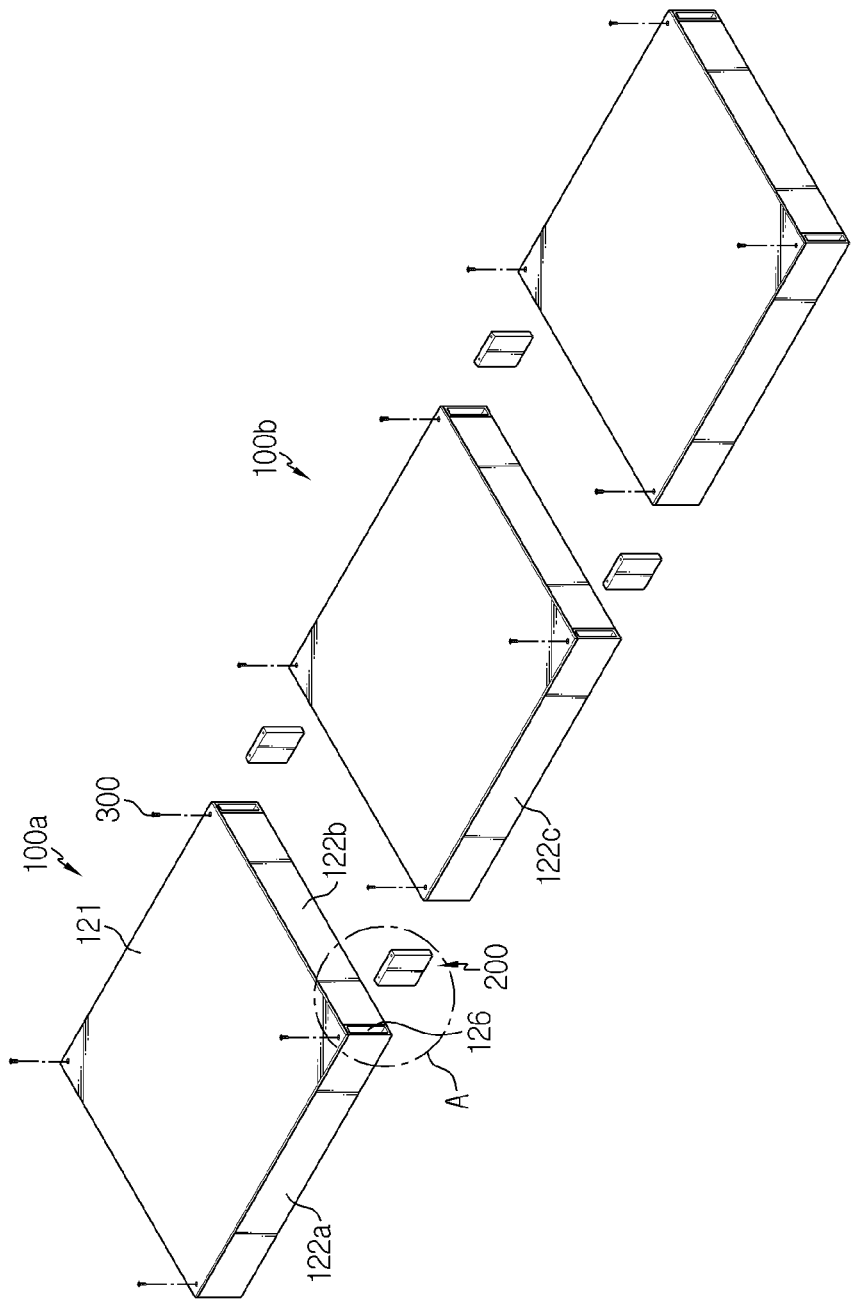
FIG. 3 is an exploded perspective view showing battery modules and connection members in the battery pack according to the first embodiment of the present disclosure.
Figure 4:
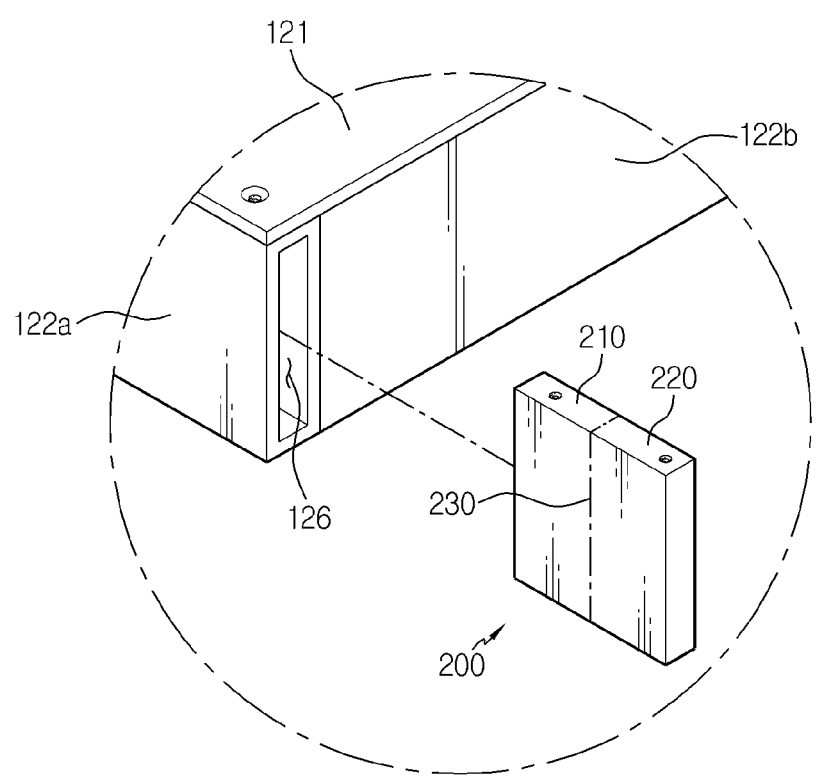
FIG. 4 is an enlarged perspective view showing a portion A of FIG. 3.
Figure 5:
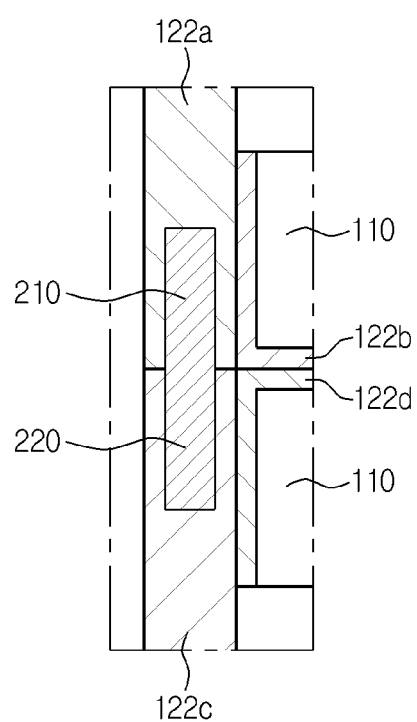
FIG. 5 is a partial cross-sectioned view showing that the battery modules are connected by the connection members in the battery pack according to the first embodiment of the present disclosure.
Figure 6:
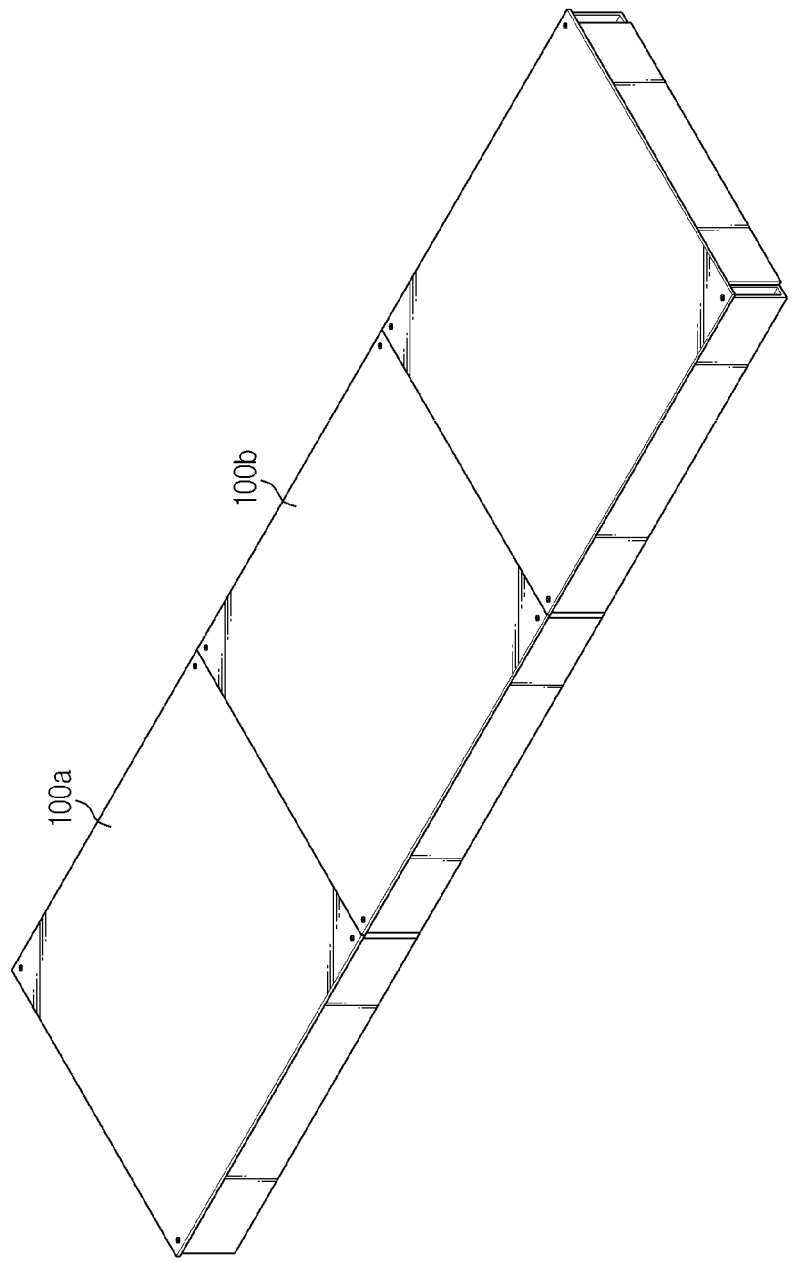
FIG. 6 is a perspective view showing that the battery modules are connected by the connection member in the battery pack according to the first embodiment of the present disclosure.

FIG. 1 is a schematic perspective view showing a battery pack according to the first embodiment of the present disclosure, FIG. 2 is an exploded perspective view showing a battery module in the battery pack according to the first embodiment of the present disclosure, FIG. 3 is an exploded perspective view showing battery modules and connection members in the battery pack according to the first embodiment of the present disclosure, FIG. 4 is an enlarged perspective view showing a portion A of FIG. 3, FIG. 5 is a partial cross-sectioned view showing that the battery modules are connected by the connection members in the battery pack according to the first embodiment of the present disclosure, and FIG. 6 is a perspective view showing that the battery modules are connected by the connection member in the battery pack according to the first embodiment of the present disclosure.

Referring to FIGS. 1 to 6, a battery pack 10 according to the first embodiment of the present disclosure includes a plurality of battery modules 100 and a connection member 200. Referring to FIG. 1, the battery pack 10 may be configured so that a plurality of battery modules 100 connected to each other are coupled to, for example, a plate 400.

Referring to FIG. 2, the battery module 100 may include a plurality of battery cells 110 and a casing member 120.

The plurality of battery cells 110 may be stacked one another in various ways. For example, the battery cells 110 may be accommodated in a cartridge assembly formed by injecting-molding plastic, and a plurality of cartridge assemblies may be stacked one another. However, the plurality of battery cells 110 may be stacked in various ways without being limited to the above.

The casing member 120 may be configured to surround the plurality of battery cells 110. The casing member 120 may be configured in various ways, and, for example, may include an upper casing 121 disposed at an upper portion of the battery cells 110 and side casings 122 disposed at side portions of the battery cells 110 and coupled to the upper casing 121. Here, the casings may be coupled to each other in various ways, for example by screwing, welding, riveting, bolting, pin coupling, bracketing, moment bonding or the like. Referring to FIG. 2, an opening 126 having a preset size may be formed in the side casing 122, and a connection member 200, explained later, may be coupled to the opening 126 of the side casing 122 to connect a plurality of battery modules 100 to each other. Meanwhile, a lower casing disposed at a lower portion of the battery cells 110 and coupled to the side casings 122 may be further provided.

The connection member 200 is configured to connect the plurality of battery modules 100 to each other. Referring to FIGS. 3 to 5, the connection member 200 includes a first insert 210 inserted into the opening 126 formed in a side casing 122a of any one battery module 100a among the plurality of battery modules 100 and a second insert 220 inserted into the opening 126 formed in a side casing 122c of another battery module 100b among the plurality of battery modules 100. The first insert 210 may be inserted into the opening 126 formed in the side casing 122a of any one battery module 100a among the plurality of battery modules 100 and then coupled thereto by using a screw 300 or a coupling member using a bolt and a nut. Also, the second insert 220 may be inserted into the opening 126 formed in the side casing 122c of another battery module 100b among the plurality of battery modules 100 and then coupled thereto by using a screw 300 or a coupling member using a bolt and a nut. Here, the opening 126 may be formed to correspond to the length of the first insert 210 or the second insert 220, for example to have the same shape.

Referring to FIGS. 3 and 6, the connection member 200 is respectively connected to the side casings 122a, 122c of the plurality of battery modules 100a, 100b to connect neighboring battery modules 100a, 100b to each other. By doing so, a frame or the like for supporting the battery modules 100 is not necessary, and thus the battery pack may be assembled simply. Thus, the material cost and the processing cost are reduced, and the space occupied by the frame is unnecessary to allow the battery modules 100 to be more closely adhered to each other. For this reason, the battery pack 100 may have an improved energy density. Here, the side casing 122 not only protects the battery cells 110 but also structurally supports the battery module 100, and thus the side casing 122 may have a thickness enough to have sufficient rigidity The connection member 200 may be fixed and coupled to the side casing 122 of the battery module 100 in various ways. For example, the connection member 200 may be coupled by screws 300 or by bolts and nuts, or in a simple way using a hooking manner. Alternatively, the connection member 200 may be coupled to the side casing 122 by welding.

Referring to FIGS. 1 and 3, after the plurality of battery modules 100 are connected by the connection member 200, the plurality of battery modules 100 may be arranged in a single layer, and the plurality of battery modules 100 may be arranged to have at least one row or at least one column. If the plurality of battery modules 100 are arranged in a single layer as above, the overall height of the battery modules 100 is lower than the case where the battery modules 100 are arranged in a plurality of layers. Thus, the plurality of battery modules 100 may be easily arranged in a space with a limited height such as an underfloor of an electric vehicle or the like.

Hereinafter, the operation and effect of the battery pack 10 according to the first embodiment of the present disclosure will be described.

Referring to FIG. 3, the battery module 100 may include a side casing 122 having an opening 126 formed therein, and the connection member 200 is inserted into the openings formed in the side casings 122a, 122c of the battery modules 100a, 100b adjacent to each other among the plurality of battery modules 100a and then coupled thereto by the screw 300 or the like. Since the plurality of battery modules 100a, 100b are connectable to each other without a frame as described above, more battery modules 100 may be disposed in the space occupied by the frame, thereby improving the energy density.

Figure 7:
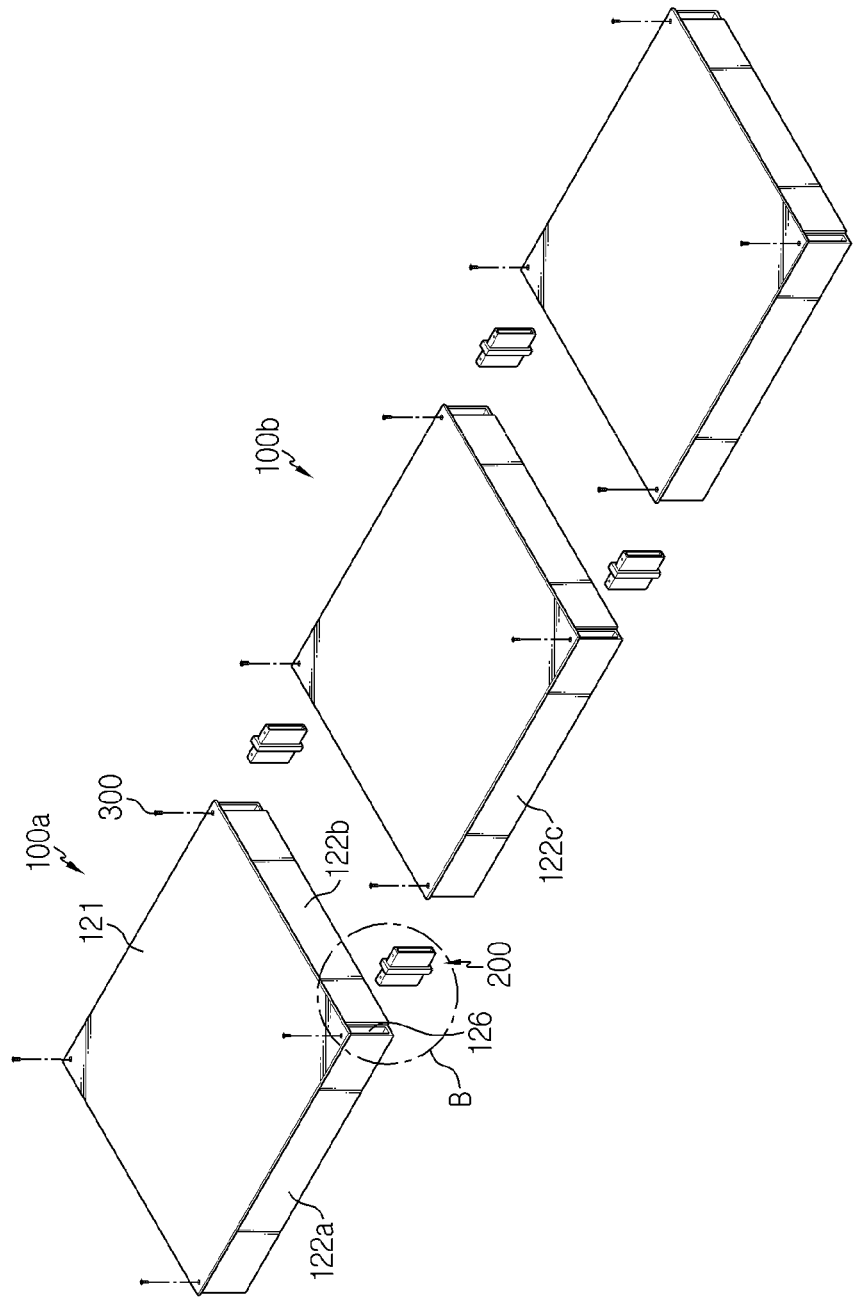
FIG. 7 is an exploded perspective view showing battery modules and connection members in a battery pack according to the second embodiment of the present disclosure.
Figure 8:
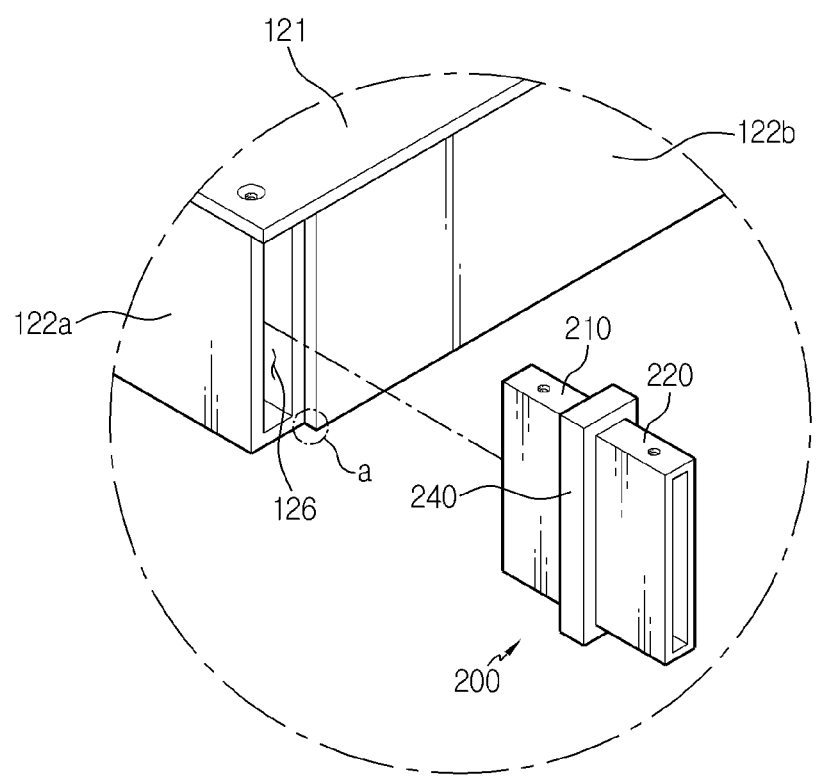
FIG. 8 is an enlarged perspective view showing a portion B of FIG. 7.
Figure 9:
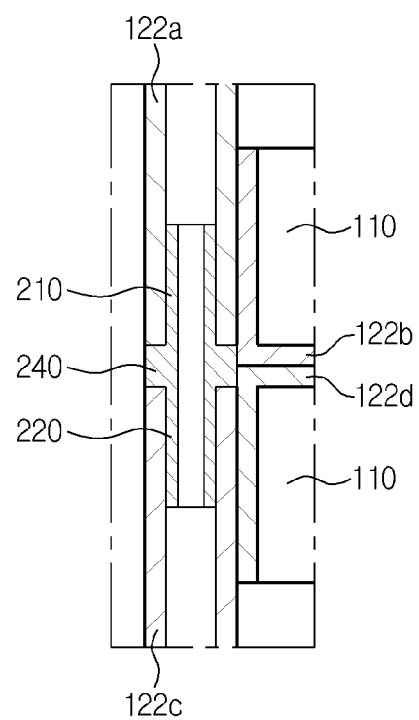
FIG. 9 is a partial cross-sectioned view showing that the battery modules are connected by the connection members in the battery pack according to the second embodiment of the present disclosure.

FIG. 7 is an exploded perspective view showing battery modules and connection members in a battery pack according to the second embodiment of the present disclosure, FIG. 8 is an enlarged perspective view showing a portion B of FIG. 7, and FIG. 9 is a partial cross-sectioned view showing that the battery modules are connected by the connection members in the battery pack according to the second embodiment of the present disclosure.

Hereinafter, the function and effect of a battery pack 10 according to the second embodiment according to the present disclosure will be described with reference to the drawings, but features common to the battery pack 10 according to the first embodiment of the present disclosure will not be described again in detail.

The second embodiment of the present disclosure is different from the first embodiment in the point that a stopper 240 is formed at the connection member 200.

Referring to FIGS. 7 and 8, the stopper 240 may be formed between the first insert 210 and the second insert 220 to prevent the first insert 210 and the second insert 220 from being inserted in excess of a predetermined range. In addition, a step (see a portion a in FIG. 8) may be formed between one side casing 122a and another side casing 122b disposed adjacent to the one side casing 122a and contacting the one side casing 122a so that the stopper 240 may be placed thereon. That is, the stopper 240 may be placed on the step a formed between the side casings 122a, 122b which are in contact with each other. Accordingly, when the plurality of battery modules 100 are connected to each other by the connection member 200, the plurality of battery modules 100 may be coupled not in a spaced state but in a contacting state (In FIG. 9, the side casings 122b, 122d are in contact with each other) (see FIG. 9).

Referring to FIGS. 7 to 9, the stopper 240 may extend in a direction intersecting the direction in which the first insert 210 and the second insert 220 are formed, for example in a direction perpendicular to the direction in which the first insert 210 and the second insert 220 are formed. In addition, the stopper 240 may be formed to extend from a portion between the first insert 210 and the second insert 220, for example from a middle portion 230 (see FIG. 4) of the first insert 210 and the second insert 220. However, the extending direction and the extending position of the stopper 240 may be set in various ways.

Figure 10:
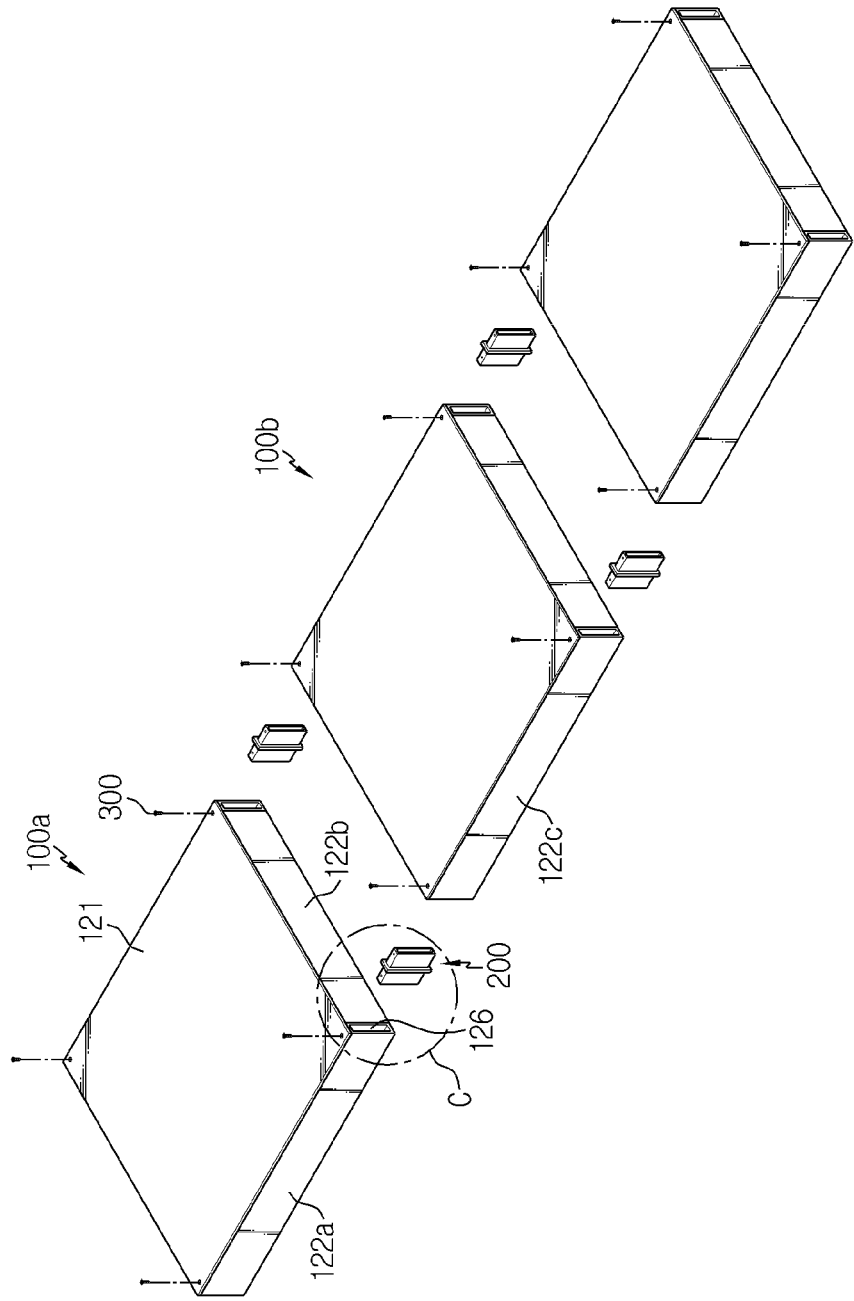
FIG. 10 is an exploded perspective view showing battery modules and connection members in a battery pack according to the third embodiment of the present disclosure.
Figure 11:
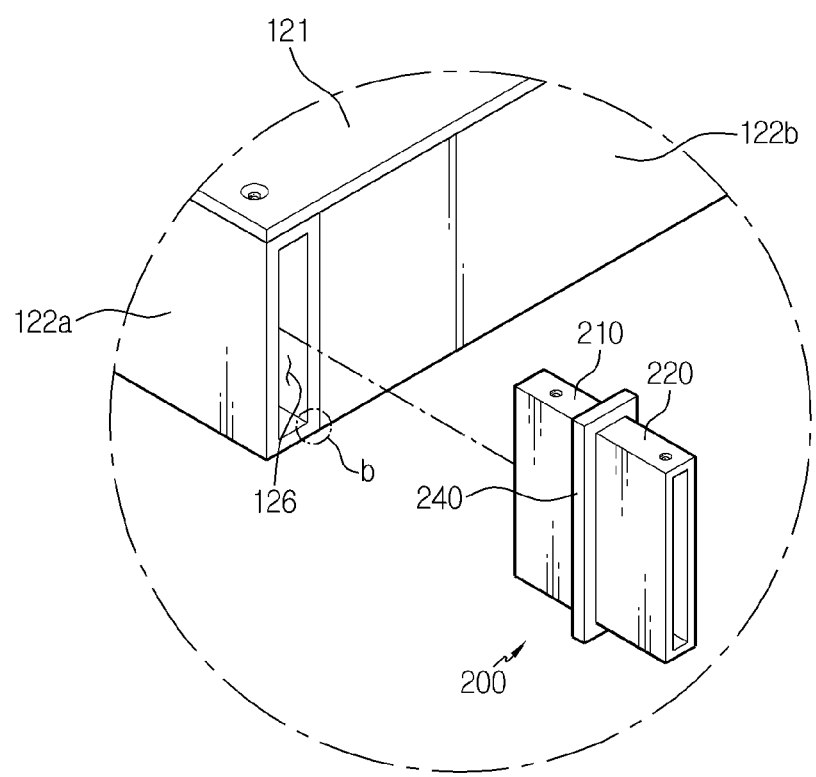
FIG. 11 is an enlarged perspective view showing a portion C of FIG. 10.
Figure 12:
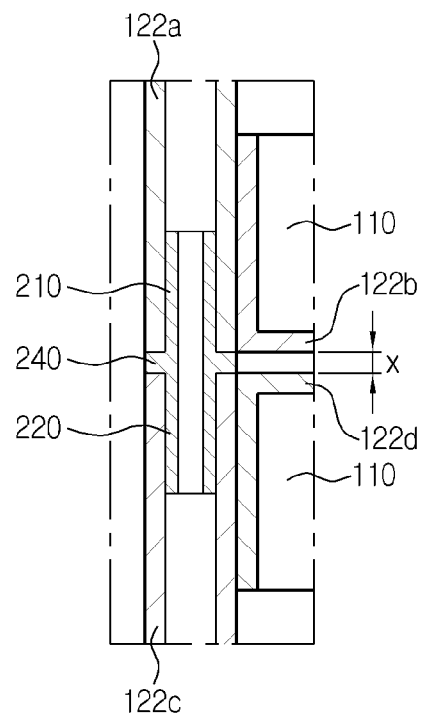
FIG. 12 is a partial cross-sectioned view showing that the battery modules are connected by the connection members in the battery pack according to the third embodiment of the present disclosure.

FIG. 10 is an exploded perspective view showing battery modules and connection members in a battery pack according to the third embodiment of the present disclosure, FIG. 11 is an enlarged perspective view showing a portion C of FIG. 10, and FIG. 12 is a partial cross-sectioned view showing that the battery modules are connected by the connection members in the battery pack according to the third embodiment of the present disclosure.

Hereinafter, the function and effect of a battery pack 10 according to the third embodiment according to the present disclosure will be described with reference to the drawings, but features common to the battery pack 10 according to the first or second embodiment of the present disclosure will not be described again in detail.

The third embodiment of the present disclosure is different from the second embodiment in the point that battery modules 100 adjacent to each other are spaced apart from each other by the stopper 240 formed at the connection member 200.

Referring to FIGS. 10 to 12, the stopper 240 of the third embodiment is identical to that of the second embodiment, but in the third embodiment, a step is not formed between one side casing 122a and another side casing 122b disposed adjacent to the one side casing 122a and contacting the one side casing 122a so that the stopper 240 may be placed thereon (see a portion b in FIG. 11), different from the second embodiment. Thus, if the connection member 200 is coupled to the plurality of battery modules 100, battery modules 100 adjacent to each other are spaced apart from each other. In other words, a predetermined gap x (see FIG. 12) of a predetermined interval is present between the battery modules 100 connected to each other. Air may move through the spaced gap x between the battery modules 100 to cool the battery modules 100. In other words, the space formed by the gap x between the battery modules 100 is used for heat dissipation of the battery modules 100.

Meanwhile, a vehicle (not shown) according to an embodiment of the present disclosure may include the battery pack 10 described above. The battery pack 10 may be used for various machines or devices using electricity and may be, for example, disposed in an electric vehicle, particularly on an underfloor of the electric vehicle. Here, the electric vehicle may include not only an electric vehicle driven purely by electricity but also a hybrid electric vehicle using another kind of energy together with electric energy.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure is directed to a battery pack and is particularly applicable to industries associated with a secondary battery.

What is claimed is:

1. A battery pack, comprising:
a plurality of battery modules, each battery module having a plurality of stacked battery cells and a casing member surrounding the plurality of battery cells, each casing member including an upper casing disposed at an upper portion of the battery cells and four side casings disposed at four side surfaces of the battery cells and coupled to the upper casing, wherein the casing member defines a space to receive the plurality of battery cells, wherein an opening having a preset size is formed in at least one of the side casings, wherein an inner wall of the side casings separates the space from the opening such that the opening is not in communication with the space; and
a connection member connecting the plurality of battery modules to each other, the connection member being inserted into the openings of two adjacent battery modules of the plurality of battery modules such that the upper casings of the plurality of battery modules are coplanar,
wherein the connection member is substantially entirely enclosed by the openings of the two adjacent battery modules such that opposite ends of the connection member are not exposed to an exterior of the battery pack, and
wherein the connection member includes a stopper, the stopper being larger than the openings of the two adjacent battery modules such that the stopper is located outside the openings of the two adjacent battery modules.

2. The battery pack according to claim 1,
wherein the plurality of battery modules connected by the connection member are arranged in a single layer.

3. The battery pack according to claim 2,
wherein the plurality of battery modules are arranged to have at least one column or at least one row.

4. The battery pack according to claim 1,
wherein the connection member includes:
a first insert inserted into the opening of the side casing of any one battery module among the plurality of battery modules; and
a second insert inserted into the opening of the side casing of another battery module among the plurality of battery modules.

5. The battery pack according to claim 4,
wherein the stopper is formed between the first insert and the second insert to prevent the first insert and the second insert from being inserted in excess of a predetermined range.

6. The battery pack according to claim 5,
wherein the stopper extends from a portion between the first insert and the second insert toward a direction intersecting the direction in which the first insert and the second insert are formed.

7. A vehicle, comprising the battery pack defined in claim 1.

8. The battery pack according to claim 1, wherein the openings are blind holes.

9. A battery pack, comprising:
a plurality of battery modules, each battery module having a plurality of stacked battery cells and a casing member surrounding the plurality of battery cells, each casing member including an upper casing disposed at an upper portion of the battery cells and four side casings disposed at four side surfaces of the battery cells and coupled to the upper casing, the four sides being perpendicular to the upper casing, wherein the casing member defines a space to receive the plurality of battery cells, wherein an opening having a preset size is formed in at least one of the side casings, wherein an inner wall of the side casings separates the space from the opening such that the opening is not in communication with the space; and
a connection member connecting the plurality of battery modules to each other, the connection member being inserted into the openings of two adjacent battery modules of the plurality of battery modules,
wherein the connection member is substantially entirely enclosed by the openings of the two adjacent battery modules such that opposite ends of the connection member are not exposed to an exterior of the battery pack,
wherein the connection member is fixed to the side casing by means of a screw or bolt distinct from the connection member, the screw or bolt being inserted through the upper casing into the connection member.

* * * * *